United States Patent [19]

Gish

[11] Patent Number: 4,790,645
[45] Date of Patent: Dec. 13, 1988

[54] FITTED EYEGLASS FRAMES

[76] Inventor: Donald A. Gish, 3107 Frandoras Cir., Oakley, Calif. 94561

[21] Appl. No.: 16,844

[22] Filed: Feb. 20, 1987

[51] Int. Cl.$^4$ .............................................. G02C 5/14
[52] U.S. Cl. .................... 351/119; 351/118
[58] Field of Search .............. 351/111, 118, 119, 123

[56] References Cited

U.S. PATENT DOCUMENTS

| | | |
|---|---|---|
| 509,967 | 12/1893 | Sumner . |
| 1,854,060 | 4/1932 | Pettersson . |
| 2,094,236 | 9/1937 | Hempel .................... 88/52 |
| 2,172,959 | 9/1939 | Hirtenstein ................ 2/13 |
| 3,620,608 | 11/1971 | Davis ...................... 351/111 |
| 3,907,410 | 9/1975 | Richmond et al. ........ 351/119 |
| 4,012,130 | 3/1977 | Guillet ..................... 351/119 |
| 4,632,104 | 12/1986 | Conrow .................... 128/163 |
| 4,676,609 | 6/1987 | Matsui ..................... 351/118 |

FOREIGN PATENT DOCUMENTS 685760 1/1953 United Kingdom .

Primary Examiner—Rodney B. Bovernick
Assistant Examiner—P. M. Dzierzynski
Attorney, Agent, or Firm—Melvin R. Stidham

[57] ABSTRACT

Fitted eyeglass frames having ear engaging members curved to conform to the full contour of the back of the ear they are to engage and moveable rearwardly with respect to the sidebars for releasing the frames for easy removal. In two forms of the invention, the ear engaging members are pivotally attached to the rear ends of the frame sidebars and magnetic and spring means are provided to hold the ear engaging members in desired contact with the ear. In another form of the invention, a spring loaded telescoping section is interposed between the ear engaging members and the sidebars of the frames, and a setscrew acting in the telescoping connection permits adjustment of the effective length of the sidebars.

11 Claims, 1 Drawing Sheet

FITTED EYEGLASS FRAMES

BACKGROUND OF THE INVENTION

1. Field of the Invention

This invention relates to frames for eyeglasses or spectacles capable of being securely held against slipping or accidental dislodgement.

2. Description of the Prior Art

Slipping of eyeglasses or spectacles because of imprecise fit is always annoying and at times can be costly if the glasses are lost or broken. Eyeglasses normally have a bow to which is attached two lenses positionable before the eyes of the user, with the bow and lenses being supported on the bridge of the nose of the user. Sidebars are hinged to and extend rearwardly from the outer ends of the bows. The glasses are held in place against the bridge of the nose by curved ear engaging portions on the sidebars and/or by curving the side-bars inwardly to press firmly against the sides of the head of the user.

Neither the ear engaging members nor the inwardly curved sidebars are completely effective in holding the glasses in place. Even when first fitted, the curved ear engaging members must be relatively loose around the ears, and extend only part way around, for the glasses to be easily removable. As time goes on, the material from which the glasses frames are made tends to lose its curvature, thus making the fit even more sloppy.

The ear engaging pieces ride up over the ears whenever the wearer tips his head forwardly, as when reading. Likewise, the inwardly curved sidebars lose some of that curvature and do not press against the sides of the head of the user hard enough to hold the glasses in place. Moreover, the inwardly curved sidebars often exert painful pressure against the wearer's head if curved inwardly enough to hold the glasses against slippage.

The head sizes and dimensions from bridge of nose to ears of different people can vary widely. Attempts have been made to design frames which are adjustable to different sizes. The most common way is to make the frames of a heat softenable plastic material so the optometrist or optician can "fit" the glasses to the wearer by heating and bending the sidebars and ear engaging portions. Even when so fitted, the glasses can still slide and be dislodged relatively easily. Elastic cords and like devices which attach to the rear ends of the sidebars and pass around the back of the head are both uncomfortable and unsightly.

Other attempts have been made to fit a single size of frame to different head sizes. An example of this is found in U.S. Pat. No. 2,172,959 issued Sept. 12, 1939 to Max M. Hirtenstein, in which the ear engaging pieces are pivotably mounted on the rear ends of the sidebars so that the relatively slightly curved ear engaging member can be swung forwardly into proximity to the ear of the wearer.

Another attempt to make the eye glasses frames adaptable to different sizes of head is found in U.S. Pat. No. 3,620,608 issued Nov. 16, 1971 to Jeannette Davis. In the Davis patent, the ear engaging portions can be moved to a desired position. Once in this position, the two parts of the sidebar are locked in place, as by a rivet.

Other patents showing various built-in adjustment features for spectacle frames are listed as follows:

| U.S. Pat. No. | Inventor | Issue Date |
|---|---|---|
| 509,967 | John F. Sumner | 12/05/1893 |
| 1,854,060 | Charles O. Pettersson | 04/12/32 |
| 2,094,236 | Paul Hempel | 09/28/37 |
| 3,907,410 | Rex Richmond, et al. | 09/23/75 |
| 685,760(GB) | Georges Lissac | 01/14/53 (Published) |

The above-listed patents are believed to be relevant to the present invention because they were adduced by a prior art search made by an independent searcher, and a copy of each of the above-listed patents is supplied to the Patent and Trademark mark Office herewith.

The term "prior art" as used herein or in any statement made by or on behalf of the applicant means only that any document or thing referred to as prior art bears, directly or inferentially, a date which is earlier than the effective date of this application.

No representation nor admission is made that any of the above-listed documents is part of the prior art in any acceptation of that term, or that no more pertinent information exists.

SUMMARY OF THE INVENTION

The present invention provides an eyeglasses frame which can be fit precisely to the particular ear and head configuration of the wearer with the eyeglasses supported on the bridge of the nose of the wearer and held precisely in position by ear engaging members closely conforming to the contours of the back of the ear around which they are engaged. The fit is so precise that the eyeglasses cannot slide or accidentally be dislodged while being worn.

In order to make removal of the eyeglasses possible, the ear engaging members can be released from their normal position in engagement with the back of the ear and moved rearwardly away from the ear so as to facilitate the forward movement of the frames which is necessary for easy removal of the eyeglasses from the head of the wearer.

During normal use, the glasses frames of the present invention are held in the desired position in contact with the complementarily curved rear portion of the ear. It should be noted that the ear engaging pieces of the present invention extend much farther around the ear than do the earpieces of existing spectacles. This is made possible by making the earpieces movable rearwardly with respect to the frame out of contact with the back of the ear so that the glasses can be lifted away from the ears and head of the user. When the glasses are put back in place for wearing, the ear engaging members are moved forwardly until they again engage the complementarily curved rear portions of the ears where they are held firmly until it is again desired to remove the eyeglasses.

The described rearward movement of the ear engaging members may be provided by pivoting their upper ends to the ends of the sidebars of the frame and releasably restraining the ear engaging members at the desired, closely-fitted position.

The ear engaging members can be shaped to conform precisely to the curvatures of the rear portions of the ears they engage by making these members out of a heat softenable plastic material. When being fitted to the wearer, the ear engaging members are softened with heat, then bent to conform closely to the curvature of the ear, then allowed to cool and harden. It should be noted that no sustained strain of any magnitude is placed on the ear engaging pieces and accordingly they do not change their shape.

In one form of the invention, the pivotal mounting of the ear engaging member on the end of the sidebar is provided with magnetically responsive members which detain the ear engaging member in the desired position against the ear, but which may be released for swinging the ear engaging member rearwardly. In another form of the invention, a loop of coil spring is mounted in the pivot joint to accomplish a similar purpose, the spring tending to urge the ear engaging member to the desired wearing position.

In another form of the invention, the pivotal connection is in the form of a hinge along the upper confronting surfaces of the sidebar and the ear engaging member. Magnetically responsive members are mounted in the confronting faces of the sidebar and ear engaging member for releasably holding them in the desired wearing position.

In another form of the invention, the normal length of the sidebar is made variable by interposing a telescoping connection between the ear engaging member and the sidebar. Spring means tends to urge the ear engaging member forwardly to the desired position contacting the back of the ear of the wearer, and a set screw is provided for limiting the forward movement of the earpiece to different positions, making it possible to adapt the same eyeglasses frame to wearers having heads of slightly different dimensions.

It is therefore a principal object of the present invention to provide eyeglasses frames having ear engaging members conforming closely to the contours of the rear of the ears they engage so as to hold the glasses securely in place, with the ear engaging members being selectively movable rearwardly for removing the eyeglasses from the head of the user.

Another object of the present invention is to provide eyeglasses frames of the character described in which the ear engaging members are self-returnable to the desired ear engaging position. Another object of the present invention is to provide eyeglasses of the character set forth in which the normal length of the sidebars of the frames is adjustable to fit the frames to heads of different sizes.

Other objects and features of advantage will become apparent as the specification progresses and from the claims.

Figure 1:
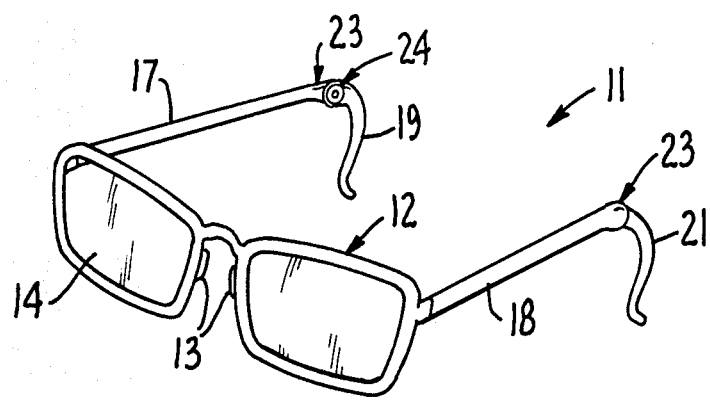
FIG. 1 is a perspective view of a fitted eyeglass frame constructed in accordance with the present invention.

While only the preferred forms of the invention are illustrated in the drawings, it will be apparent that various modifications could be made without departing from the ambit of the claims.

DESCRIPTION OF THE PREFERRED EMBODIMENTS

As may be seen in the accompanying drawings, the fitted eyeglass frame 11 of the present invention provides a bow 12 supportable on the bridge of the nose of the wearer (not shown) as by pads 13 formed for holding a pair of lenses 14 and 16 before the eyes of the wearer, a pair of sidebars 17 and 18 extending rearwardly from the bow 12 on opposite sides of the head of the wearer, ear engaging members or earpieces 19 and 21 on said sidebars 17 and 18, respectively, curved to conform to the shape of the rear portion of the ear 22 of the wearer adjacent to the head, with the normal length of the sidebars 17 and 18 being such as to press said ear engaging members 19 and 21 against the complementarily curved portions of the ears, and means 23 for moving the ear engaging members 19 and 21 away from the complementarily curved portions of the ears 22 for facilitating removal of the eyeglasses from the head of the wearer.

In the forms of the invention illustrated in FIGS. 1 through 5 of the drawings, the means 23 provides a pivotal mounting 24 of the ear engaging members 19 and 21 on the rear ends of the sidebars 17 and 18 for swinging movement of the members 19 and 21 toward and away from the ear of the wearer and detaining means 26 is provided on the sidebars 17 and 18 and their ear engaging pieces 19 and 21 for releasably securing the ear engaging members in a desired position with the complementarily curved portions 27 of the ear engaging members in light but uniform contact with the complementarily curved back portions of the ears 22 for preventing slipping and dislodgment of the eyeglass frames 11.

Figure 2:
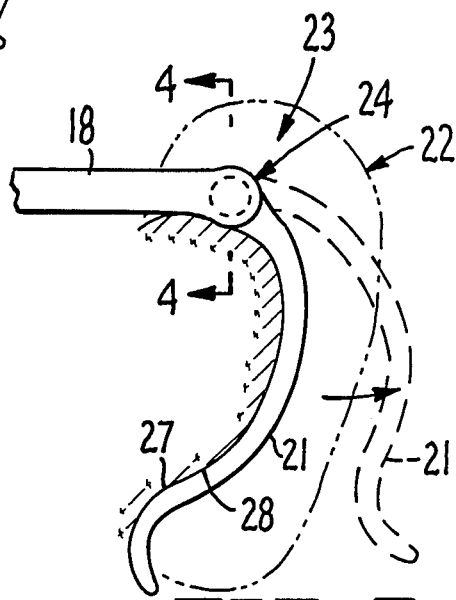
FIG. 2 is a side elevational view of the rear portion of a sidebar of the frame of FIG. 1 having a curved ear engaging member pivotally attached thereto, with the ear engaging member shown in operative position with respect to the ear of a user.
Figure 3:
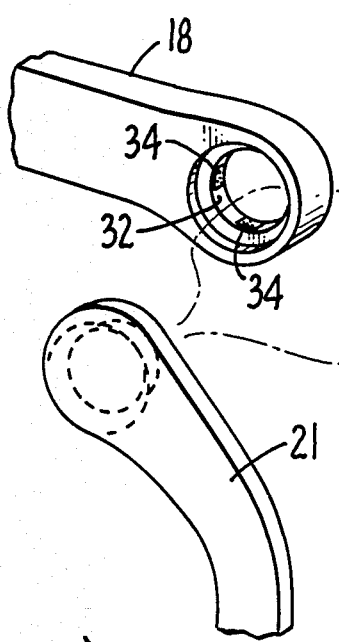
FIG. 3 is an enlarged, exploded perspective view of the pivotal connection between the sidebar and ear engaging member of FIG. 2.
Figure 4:
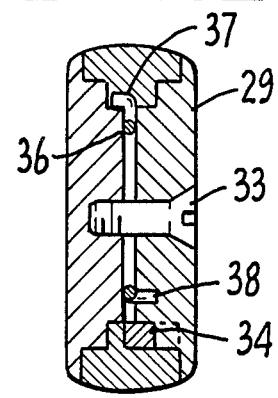
FIG. 4 is an enlarged vertical cross-sectional view taken substantially on the plane of Line 4—4 of FIG. 2.

In the form of the invention shown in FIGS. 2 through 4 of the drawings, the pivotal mounting 24 of each of the ear engaging members 19 and 21 on their respective sidebars 17 and 18 is in the form of a pivot member 29 having a cylindrical surface 31 journaled in a complementarily cylindrical surface 32 formed in the end of sidebar 18. Attachment means in the form of a screw 33 is provided for releasably securing the pivot member 29 to the ear engaging member 21 for rotation therewith.

The detaining means 26 is provided on the pivot member 29 and the sidebar 18 for releasably holding the ear engaging member 21 at a desired rotational position against the ear of the wearer. As shown in FIG. 3, the detaining means 26 may be magnetic, or in the form of a resilient spring, or both. The magnetic detaining means provides magnetically attractive members 34 inlaid in the cylindrical surface 31 of the pivot member 29 and inlaid in the cylindrical surface 32 of the sidebar 18. The members 34 are positioned for alignment with each other when the ear engaging member 21 is in its desired open or closed rotational position, and the magnetic attraction between the members 34 releasably holds the ear engaging member 21 in such position.

Also illustrated in FIG. 3 of the drawings is a detaining means 26 in which a spiral spring member 36 has its opposite ends 37 and 38 connected to the sidebar 18 and pivot member 29 respectively. The spring member 36 is biased to urge the ear engaging member 21 to its operative position in contact with the rear of the ear when the spring 36 is relaxed.

Figure 5:
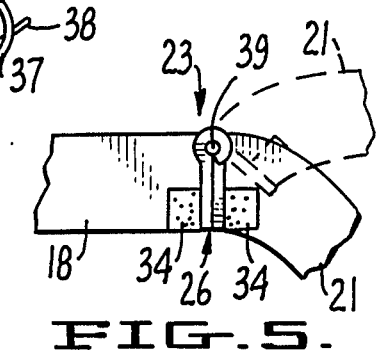
FIG. 5 is an enlarged fragmentary view of an alternate form of the invention.

In the form of the invention illustrated in FIG. 5 of the drawings, the pivotal mounting of the ear engaging members 19 and 21 on their respective sidebars 17 and 18 is provided by a hinge 39 attached between the ear engaging member 21 and the sidebar 18 at their upper edges. This permits swinging of the ear engaging members rearwardly and upwardly for releasing the frame from the ears as illustrated in dotted lines in FIG. 5 of the drawings. Magnetically attractive members 34 are mounted in the confronting ends of the sidebar 18 and its pivotally attached ear engaging member 21 for releasably holding the latter in the desired operative position in contact with the ear of the wearer.

Figure 6:
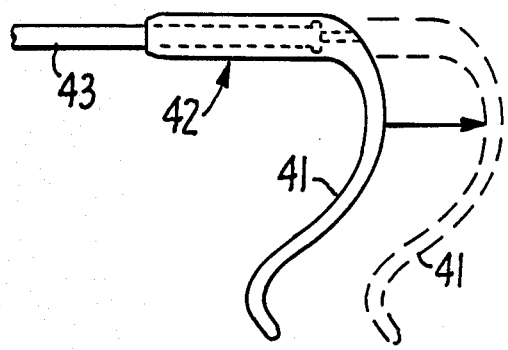
FIG. 6 is a side elevational view of the rear portion of an eyeglasses frame sidebar constructed in accordance with the present invention and having a telescoping connection to a curved ear engaging member.
Figure 7:
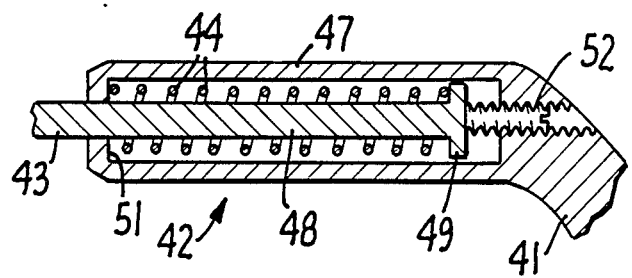
FIG. 7 is an enlarged vertical cross-sectional view of the telescoping connection of FIG. 6.

In the form of the invention illustrated in FIGS. 6 and 7 of the drawings, the means 23 for moving the ear engaging member 41 rearwardly away from the complementarily curved portions of the ears 22 is in the form of expandable means 42 for selectively extending the length of the sidebar 43. As may best be seen in FIG. 7 of the drawings, the expandable means 42 is provided by a telescoping section 42 at each of the sidebars 43. Resiliently expandable means in the form of a compressable coil spring 44 is mounted in the telescoping section 42 and is biased to hold the telescoping section in its retracted position, while still permitting the telescoping section to be expanded to its extended position.

As shown in FIG. 7 of the drawings, the telescoping section 42 is in the form of an elongated tube 47 extending forwardly from the upper end of the ear engaging member 41. The sidebar 43 is provided with an elongated plunger 48 reciprocable in tube 47 and having an enlarged head 49 at its rear end. The spring 44 here is compression spring mounted in the tube 47 in surrounding relation to the plunger 48 and bearing at its opposite ends against the enlarged head 49 and an abutment 51 at the end of tube 48.

Inward movement of head 49 within tube 47 is limited by a setscrew 52 which provides a means for adjusting the effective length of the sidebar 43. The setscrew 51 is threadably engaged in the ear engaging member 41 and protects forwardly into the tube 47 for engaging and halting relative rearward movement of the enlarged head 49 in the tube 47, whereby rotation of the setscrew 52 is effective to adjust the normal length of the sidebar 43.

From the foregoing, it will be apparent that the fitted eyeglass frames of the present invention provide a novel and workable approach to the problem of retaining glasses or spectacles in place against slipping or accidental dislodgment without discomfort to the wearer.

What is claimed is:

1. Eyeglasses frames, comprising:
    a bow adapted to be supported on the nose of the wearer and formed for holding a pair of lenses before the eyes of the wearer,
    a pair of sidebars extending rearwardly from said bow on opposite side thereof,
    relatively rigid ear engaging members movably mounted as a unit on the rear ends of said sidebars said ear engaging members being curved downward and the forward to engage around the top, rear and bottom portions of the ear of the wearer adjacent to the head,
    said ear engaging members being mounted to move rearwardly as a unit for facilitating removal of said eyeglasses from the head of the wearer and
    yieldable spring means engaging between said sidebars and said ear engaging members and biasing said ear engaging members forwardly.

2. Eyeglasses frames as described in claim 1 including:
    means for adjusting the normal length of said sidebars to fit said frames to heads of different sizes.

3. Eyeglasses frames as described in claim 1 including:
    a pivotal mounting of said ear engaging members on the rear ends of said sidebars for swinging movement of said ear engaging members toward and away from said bow,
    and detaining means for releasably securing said ear engaging members in a desired position on said sidebars for preventing slipping and dislodgement of said eyeglasses frames.

4. Eyeglasses frames as described in claim 3, and wherein said pivotal mounting of each of said ear engaging members on said sidebars comprises a hinge attached between said ear engaging members and said sidebars at their upper edges for swinging of said ear engaging members rear and upwardly, and magnetically attractive members in the conforming ends of said sidebar and its pivotally attached ear engaging member formed for releasably holding the latter in said desired position.

5. Eyeglasses frames as described in claim 3, and wherein said pivotal mounting of each of said ear engaging members on said sidebars provides a pivot member having a cylindrical surface, said sidebar is formed an internal cylindrical surface journalling said cylindrical surface of said member, attachment means is provided for releasably securing said pivot member to said ear engaging member for rotation therewith, and said detaining means provided on said pivot member and said sidebar for releasably holding said engaging member at a desired rotational position.

6. Eyeglasses frames as described in claim 5, and wherein said detaining means comprises magnetically attractive members inlaid in said cylindrical surface of said pivot member and said cylindrical surface of said pivot member and said cylindrical surface of said sidebar in position for alignment when said ear engaging member is in said desired rotational position.

7. Eyeglasses frames as described in claim 5, and wherein said detaining means comprises a spiral spring member having opposite ends connected to said pivot member and to said sidebar, with said spring member being biased to urge said ear engaging member to said desired rotational position.

8. Eyeglasses frames as described in claim 1 including:
    a telescoping section interconnecting said sidebars and said ear engaging members enabling movement of said ear engaging member rearwardly to selectively extend the lengths of said sidebars.

9. Eyeglasses frames as described in claim 8 including:
    resiliently expandable means mounted in said telescoping section biased to hold said telescoping section in its retracted position.

10. Eyeglasses frames as described in claim 9 including:

means for adjusting the normal length of said sidebars top fit said frames to heads of different sizes.

11. Eyeglasses frames as described in claim 9, and wherein said telescoping section comprises:
   an elongated tube extending forwardly from the upper end of said ear engaging member.
   an elongated plunger having an enlarged head extending rearwardly from the rear end of said sidebar within said tube,
   a helical compression spring mounted in said tube in surrounding relation to said plunger and bearing against said enlarged head and said rear end of said sidebar,
   and a setscrew threadably engaged in said ear engaging member and projecting forwardly into said tube for engaging and halting relative rearward movement of said englarged head in said tube whereby rotation of said setscrew is effective to adjust said normal length of said sidebar.

* * * * *